United States Patent [19]

Harigaya

[11] Patent Number: 4,628,377
[45] Date of Patent: Dec. 9, 1986

[54] INFORMATION SIGNAL REPRODUCING APPARATUS

[75] Inventor: Isao Harigaya, Kanagawa, Japan

[73] Assignee: Canon Kabushiki Kaisha, Japan

[21] Appl. No.: 606,705

[22] Filed: May 3, 1984

[30] Foreign Application Priority Data

May 12, 1983 [JP] Japan ................................. 58-83915
May 12, 1983 [JP] Japan ................................. 58-83916
May 12, 1983 [JP] Japan ................................. 58-83917

[51] Int. Cl.$^4$ ........................ G11B 15/18; G11B 19/00
[52] U.S. Cl. .................................. 360/72.1; 360/72.3; 360/74.1; 360/74.2
[58] Field of Search .................... 360/72.1, 72.2, 72.3, 360/74.1, 74.2, 74.4, 74.5, 74.6, 74.7

[56] References Cited

U.S. PATENT DOCUMENTS 3,921,220 11/1975 Primosch et al. .................. 360/72.3
4,232,346 11/1980 Kobler .................................. 360/71
4,297,732 10/1981 Freudenschuss .................. 360/72.1
4,446,495 5/1984 Orimoto et al. .................... 360/74.1

Primary Examiner—George G. Stellar
Attorney, Agent, or Firm—Toren, McGeady, Stanger, Goldberg & Kiel

[57] ABSTRACT

Disclosed is an information signal reproducing apparatus reproducing apparatus for reproducing information signals recorded on a recording medium, moving apparatus for moving the recording medium relative to the reproducing apparatus, manually operable apparatus for indexing a first position and a second position on the recording medium, and control apparatus for controlling the operation of the reproducing apparatus and the moving apparatus so that reproduction of the information signals which have been recorded between the first and the second positions is automaticallly repeated in either direction.

36 Claims, 5 Drawing Figures

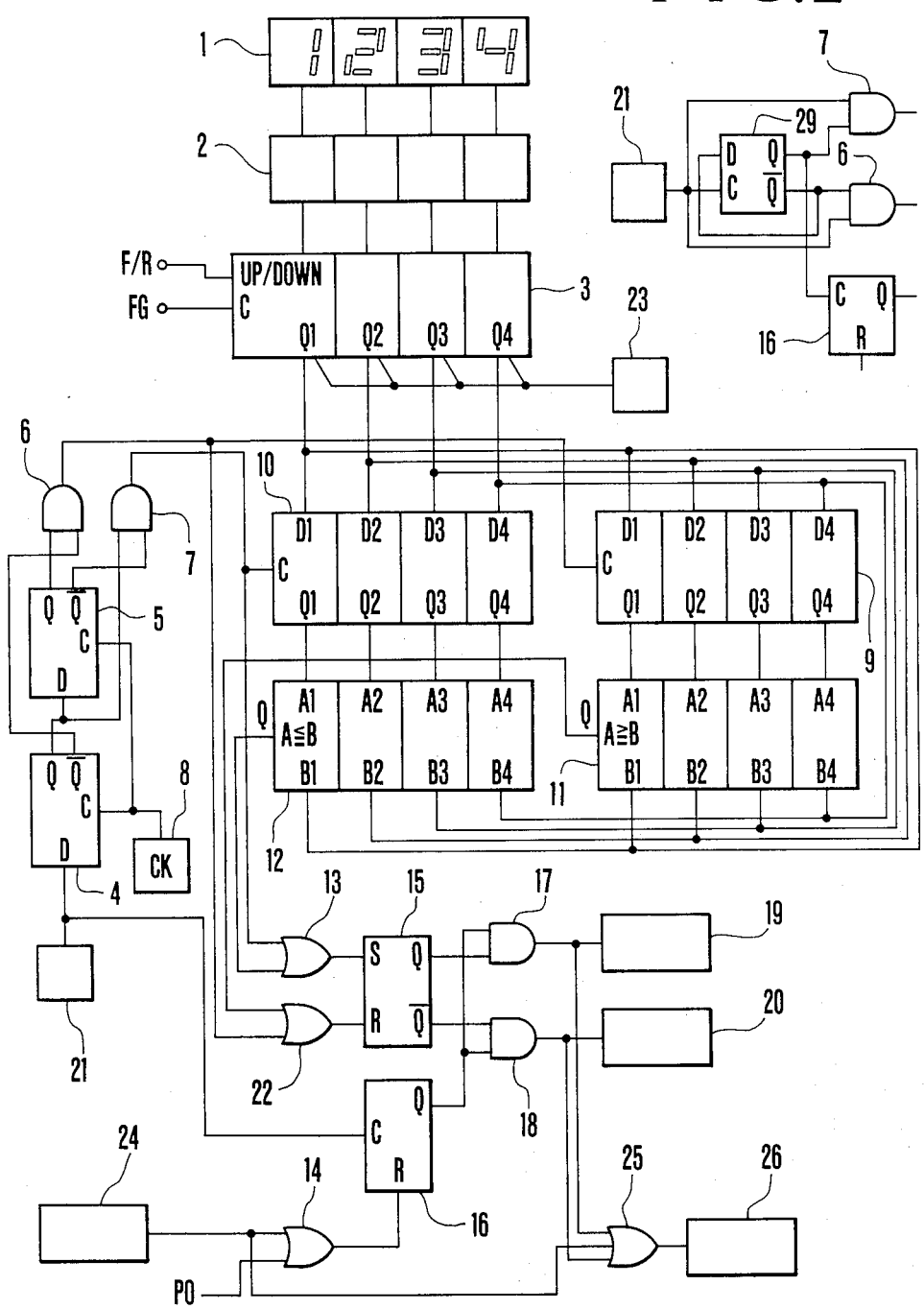

INFORMATION SIGNAL REPRODUCING APPARATUS

BACKGROUND OF THE INVENTION

1. Field of the Invention

This invention relates to an apparatus for reproducing information signals from a recording medium, and more particularly to an information signal reproducing apparatus which automatically repeats reproduction of a desired region of the recording medium.

2. Description of the Prior Art

In the following this specification will be described, using as an example, an information signal in the form of at least the video signal recorded in the helical tracks of magnetic tape for video tape recorders (VTR).

When operating the conventional VTR in the so-called "repeat reproduction" mode, the operator has generally been required to stop the forward movement of the recording medium or tape at the termination of desired reproduction, to reverse the direction of the movement of the tape, to stop the tape at the beginning of the desired reproduction and then to begin reproducing operation as the tape moves forward by respectively using their different keys or buttons, and to repeat such operations procedures whenever the operator wants to.

Since the apparatus for reproducing the video signals recorded on the tape is applied as a learning aid or for analyzing the motion of an experienced sportsman in order to amend one's own bad habits, it often happens that the same scene is repeated many times until the viewer is satisfied. This is true of all fields of sport such as golf, baseball, bowling, tennis, ski and skate, etc., since imitation of every movement of the expert results in rapid progress in developing skill.

However, the imitator, while looking at the video display, must repeatedly practice the concurrent operation himself. His performance is interrupted each time the reproduction apparatus is to be reset by operating the stop key (or button), the rewind start key (or button), the stop key (or button) and the reproduction start key (or button) successively. He cannot continue to concentrate on the exercising. Moreover, when resetting the reproduction apparatus, the keys or buttons must be touched in an ideally timed relationship. Otherwise, different reproduced pictures will be presented on the display with different cycles of reproduction.

For this reason, a VTR is desired which has the capability of automatically repeating the cycle of reproducing and resetting the magnetic tape including any desired portion or section thereof. To be effective, however, the user must set up the reproduction apparatus with the assignment of that portion or section of the magnetic tape which is to be reproduced repeatedly. This process gives the user a troublesome and difficult problem, because it includes the accurate manually operated steps of, for example, prior to making that assignment, preliminarily searching out what portion or section of the magnetic tape is to be repeatedly reproduced, and indexing the initial and terminal ends of that portion or section. Furthermore, during reproduction recycling, as the tape is moved in the reversed direction, the user needs to be sure that the terminal end of that movement is not out of coincidence with the indexed one. If it is out of coincidence, re-adjusting the position of the indexing control member must be carried out manually. And, the apparatus must be manually switched from the "repeat reproduction" mode. Thus, for the user, it is very difficult to handle. Sometimes the user will forget to set off the repeat reproduction mode. Then the life of the magnetic tape will be greatly shortened or the portion of the tape which is repeatedly reproduced is damaged. That is, after the user has gone, leaving the apparatus in operation, thinking that he will be gone a short time, he is diverted and comes back much too late. As the same scene is repeatedly being viewed, he will fall asleep, forgetting to switch off the apparatus. It is not certain that other similar events will not occur. Though the magnetic tape itself has been improved in strength, in order to increase the recording time per article which is sought to be achieved, the thickness of the tape is gradually thinned. The repeated passage of the same area of the tape across the reproduction head must be avoided. Otherwise premature shortening of the life of the tape will result.

Such problems arising from the use of the above-described repeated reproduction capability are not confined to the VTRs. Similar problems will arise when it is applied to other types of information signal reproduction apparatus such as audio tape recorders, audio discs and video discs.

It is, therefore, an object of the present invention to eliminate all of the above-described various problems arising from the use of the prior art apparatus in repeat reproduction.

Another object of the invention is to provide an information signal reproduction apparatus in which the setting operation for a repeat reproduction mode is very easy.

Another object of the invention is to provide an information signal reproduction apparatus in which only one key or button suffices for setting a desired period of repeat reproduction.

Another object of the invention is to provide an information signal reproduction apparatus which can be set up on the repeat reproduction mode by one operation of a control key or button.

Another object of the invention is to provide an information signal reproduction apparatus which can be respectively set for either a long or a short period of repeat reproduction by a simple operation.

Another object of the invention is to provide an information signal reproduction apparatus reduces the possibility of selecting the wrong period of repeat reproduction.

Another object of the invention is to provide an information signal reproducing apparatus in which repeat reproduction of the desired portion of the recording medium can be performed in forward and/or reversed directions.

Another object of the invention is to provide an information signal reproduction apparatus capable of preventing the life of the recording medium from being greatly shortened due to repeat reproduction.

Other objects and features of the invention will become apparent from the following detailed description of embodiments thereof taken in conjunction with the accompanying drawings.

SUMMARY OF THE INVENTION

An information signal reproducing apparatus including reproducing means for reproducing information signals recorded on a recording medium, moving means for moving the recording medium relative to the reproducing means, manually operable means for indexing a first portion and a second position on the recording medium, and control means for controlling at least the operation of the moving means so that the information signals which have been recorded in an area of the medium between the first and second positions are repeatedly reproduced in either direction.

BRIEF DESCRIPTION OF THE DRAWINGS

FIG. 1 is an electrical circuit diagram, partly in block form, of an embodiment of an information signal reproduction apparatus according to the present invention.

FIG. 2 is a partial electrical circuit diagram of another embodiment of the present invention.

DETAILED DESCRIPTION OF THE PREFERRED EMBODIMENTS

Figure 3:
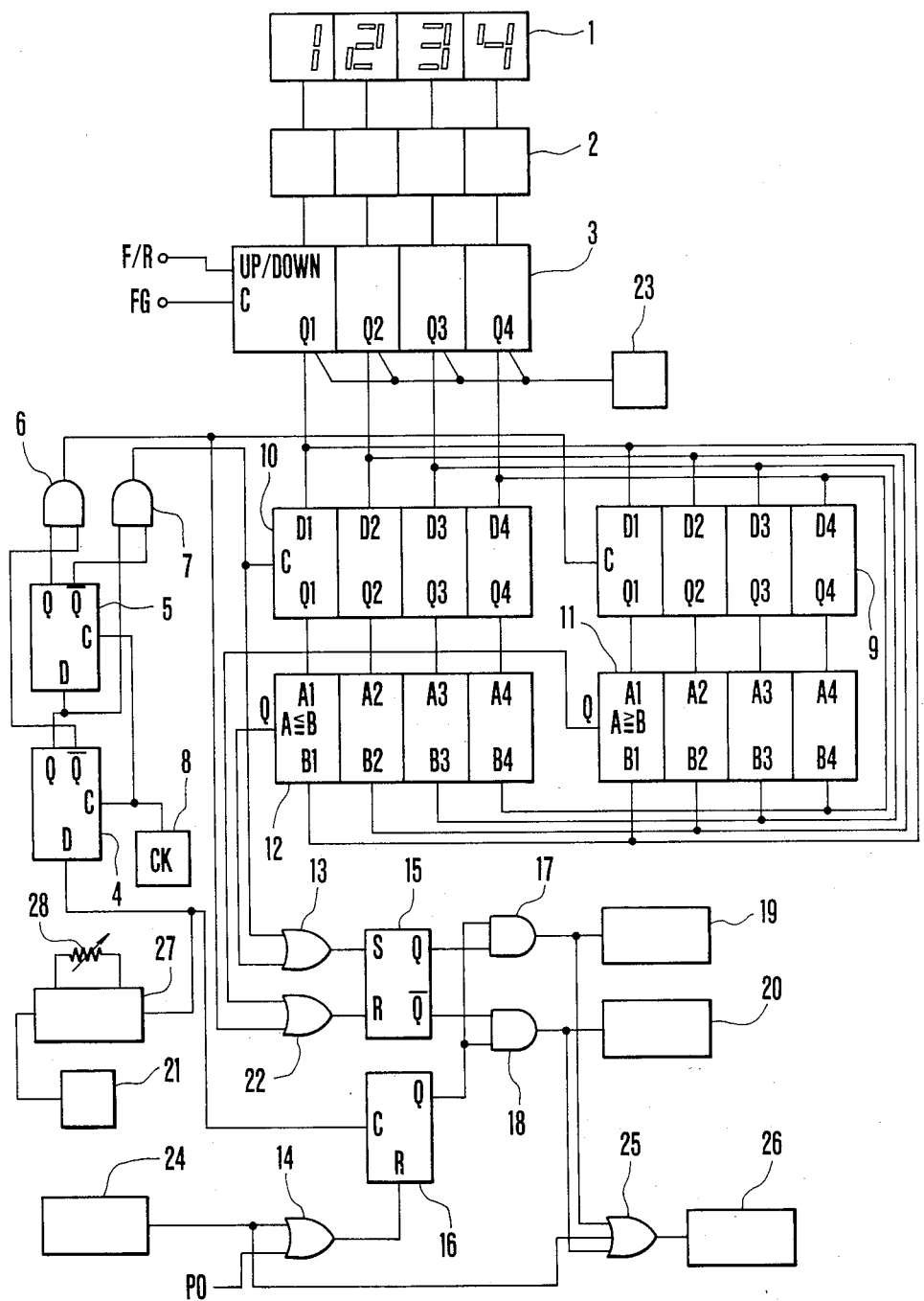
FIGS. 3, 4 and 5 are diagrams similar to FIG. 1 except that they illustrate other embodiments of the present invention.

In FIG. 1 there is shown a first embodiment of a control circuit for the apparatus according to the present invention including a display 1 connected through a decoder 2 to a tape counter 3. The counter 3 represents a pulse signal FG which is generated in response to the revolution of a reel motor (not shown) at a clock terminal C thereof, and another signal R/R representing either one of the forward and reverse directions of rotation of the reel motor at an UP/DOWN terminal thereof and responsive to forward rotation of the reel motor (advancing the tape in the forward direction), counts up pulses arriving at the terminal C, and responsive to reverse rotation of the reel motor (moving the tape backward) counts down the pulse signal FG.

A first D-flip-flop (hereinafter D-F.F.) 4 receptive of a signal produced by the operation of a repeat reproduction key 21 at its D input terminal operates in synchronization with clock pulses from a generator 8. A second D-F.F. 5 has a D input terminal connected to the Q output of the first D-F.F. 4. AND gates 6 and 7 produce latch signals which store the data in the counter 3 on registers 9 and 10 respectively. The first register 9 stores the latch signals of the data of the counter 3 which appears when the initial end of a repeat reproduction is indexed, and the second register 10 stores the latch signals of the data which appears when the terminal end of that reproduction is indexed.

Comparators 11 and 12 each have two inputs A and B connected to the outputs of the counter 3 and the registers 9 and 10. The control circuit further includes four OR gates 13, 14, 22 and 25, flip-flops (F.F.) 15 and 16, AND gates 17 and 18, a tape backward advance device 19, a tape forward advance device 20, a resetting key 23 for the counter 3, a normal reproduction key 24, and a reproducing device 26 including rotatable reproduction heads and a signal processing circuit.

Next operation of the circuit of FIG. 1 will be explained. When the apparatus is in the reproduction mode, the counter 3 counts up or down the pulse signal FG or the number of revolutions of the reel motor, depending upon the forward or reverse direction of rotation. At a time during this operation, the user may push down the repeat reproduction key 21, whereby a high level signal is applied to the D input terminal of the D-F.F. 4. The Q output of the D-F.F. 4 then becomes high level in synchronization with the rising edge of a first clock pulse from the generator 8. As the input at the D input terminal of the D-F.F. 5 is, therefore, also at a high level, the rising edge of a second clock pulse changes the Q output of the D-F.F. 5 to a high level. Because the AND gate 7 is receptive of the Q output of the D-F.F. 4 and the $\overline{Q}$ output of the D-F.F. 5, its output is changed to a high level by the rising edge of the first clock pulse after the actuation of the repeat reproduction key 21, and then again to a low level by the rising edge of the next clock pulse. Also, because the opposite AND gate 5 is receptive of the $\overline{Q}$ output of the D-F.F. 4 and the Q output of the D-F.F. 5, its output becomes a high level for one clock period when the user removes his finger from the repeat key 21.

As a result, when the repeat reproduction key 21 is pushed down, the data of the counter 3 is latched or stored in the register 10 by the high level output of the AND gate 7. When the repeat reproduction key 21 is released, the data of the counter 3 is latched on the register 9 by the output of the gate 6.

Since a signal PO, which becomes a high level only when a power switch (not shown) is thrown, is applied through the OR gate 14 to the reset terminal R of F.F. 16, the Q output level of F.F. 16 is low at this stage or condition. Also, since the output level of the normal reproduction key 24 is high even in the normal reproduction mode the Q output level of the F.F. 16 is low.

Here when the repeat reproduction key 21 is pushed down, the Q output level of the F.F. 16 chanhges to high, opening the AND gates 17 and 18. Since, in the meantime, the F.F. 15 is set by the latch signal from the gate 7 through the OR gate 13, the tape backward advance device 19 is rendered operative by the output of the AND gate 17, and as it is given to the OR gate 25, the reproducing device 26 is also rendered operative. Thus, the apparatus is switched to the reverse reproduction mode.

It is to be noted here that at this time the latch signal from the AND gate 7 causes the register 10 to latch the current data from the ever changing data of the counter 3, that is, the data for the terminal end of repeat reproduction. Thus, the terminal end of the repeat reproduction is indexed and memorized. Also, when in the reverse reproduction mode, the counter 3 counts down the pulse signal FG.

And, the user, while looking at a TV receiver type monitor (not shown), continues to press the repeat reproduction key 21 until the beginning of the scene which is to be reproduced appears. As the user then releases the repeat reproduction key 21, the initial end of the repeat reproduction is indexed in the following way.

As has been described above, when the repeat reproduction key 24 is released, the output of the AND gate 6 is changed to and maintained at a high level for one clock period. Thereby the content of the counter 3, which at this moment has just transferred to the register 9, is latched or stored therein. At the same time the output of the AND gate 6 resets the F.F. 15 through the OR gate 22, whereby the tape backward advance device 19 is stopped and the tape forward advance device 20 is sequentially rendered operative, advancing the tape in the forward direction. Since, at this time, the reproducing device 26 is also operative, normal reproduction starts.

As normal reproducing goes on, the counter 3 counts up the pulse signal FG. When the data of the counter 3 either coincides with or exceeds the data for the terminal end of the repeat reproduction stored in the register 10, the comparator 12 changes its Q output to a high level. In response to this, the F.F. 15 automatically switches the apparatus to the reverse reproduction mode.

As the reverse reproduction starts, the counter 3 counts down the pulse signal FG. When the data of the counter 3 either coincides with or is below the data for the initial end of the repeat reproduction stored in the register 9, the other comparator 11 changes its Q output to a high level which resets the F.F. 15. Thus the apparatus is automatically switched to the normal reproduction mode for the second time. This procedure repeats itself.

It is in such a way that reproduction of the desired portion or section of the tape whose terminal and initial ends were indexed when the repeat reproduction key 21 had been respectively pushed down and released is automatically repeated.

To terminate the repeat reproducing operation, the user only needs to push down the normal reproduction key 24. That is, responsive to this, the F.F. 16 changes its Q output to a low level, whereby the AND gates 17 and 18 are gated off. It is also possible to otherwise design the circuit so that the stop key, the fast forward key, the fast rewind key, or any other key serves as a stop key for the repeat reproduction.

It will be appreciated that because the pressing of the repeat reproduction key 21 causes reversing of the tape, the terminal end of the repeat portion can be determined in the first place, giving an advantage that what information is in record on that portion of the tape which is desired by the user to be subjected to automatic of reproduction repeating can be ascertained before he determines the range of repeat reproduction and therefore there is no possibility of indexing what is not intended. This leads to easy operation for starting the repeat reproduction.

It is noted here that the operation of the normal reproduction key 24 causes the tape forward advance device 20, or another similar device for tape forward advancing (not shown), to operate together with the reproducing device 26 for normal reproduction of the tape.

FIG. 2 illustrates a portion of a second embodiment of the control circuit according to the present invention, or a key input stage of the circuit. In the drawing, a flip-flop 29 is triggered when the repeat reproduction key 21 is pushed down. The $\overline{Q}$ output of the F.F. 29 is connected to the D input terminal thereof. The AND gate 7 receives the Q output of the F.F. 29 together with the output of the repeat reproduction key 21 while the AND gate 6 receives the $\overline{Q}$ output of the F.F. 29 together with the output of the repeat reproduction key 21. Furthermore, the F.F. 16 receives the Q output of the F.F. 29 at its C input terminal. When the Q output of the F.F. 29 is changed to high level, the terminal end of repeat reproduction is set in the register 10 of FIG. 1 by the output of the AND gate 7, and at the same time the tape motor is reversed. And, when the repeat reproduction key 21 is pushed down for the second time, the F.F. 29 is reset, and the $\overline{Q}$ output becomes high level, whereby the initial end of the repeat reproduction is set in the register 9 by the output of the AND gate 6, and the tape starts to move in the forward direction.

It is to be understood that in the second embodiment, holding the repeat reproduction key 21 in the depressed position for the time during which the tape moves in a reversed direction from the terminal end of the repeat portion to the initial one is no longer necessary.

FIG. 3 illustrates a third embodiment of the control circuit according to the present invention wherein the same reference numerals as in FIG. 1 identify parts the similar to those shown in FIG. 1. A timer circuit 27 has an output which rises when the repeat reproduction key 21 is operated or pushed down and is maintained at the high level for a time manually set in a variable resistor 28. The output of the timer circuit 27 is applied to the D input terminal of the F.F. 4 and to the C input terminal of the F.F. 16. In the first embodiment of FIG. 1, for indexing the initial and terminal ends of a repeat reproduction, the user is respectively required to push down and release repeatedly the reproduction key 21. But in this or the third embodiment, what is manually indexed by the repeat reproduction key 21 is only the terminal end of repeat reproduction, while the initial end is automatically indexed by the output of the timer circuit 27. Therefore, there is no need of taking care of the timing of either the releasing or the second cycle of operation of the repeat reproduction key 21 in the first and second embodiments. Moreover, the length of the section to be repeatedly reproduced can be altered by varying the value of resistance of the variable resistor 28.

Figure 4:
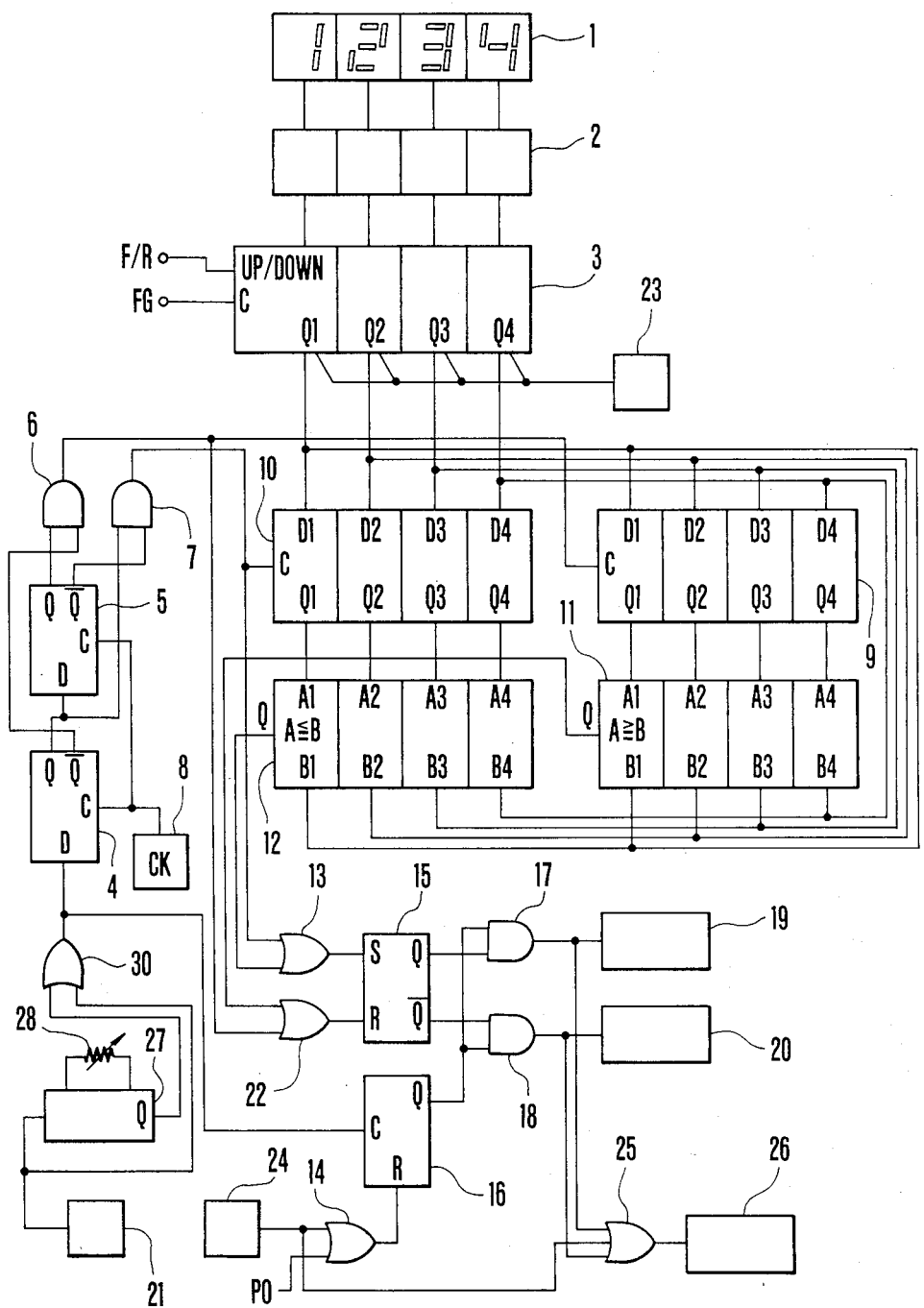

FIG. 4 illustrates a fourth embodiment of the control circuit according to the present invention wherein the parts similar to those shown in FIG. 3 are identified by the same reference numerals.

An OR gate 30 receives the output of the repeat reproduction key 21 and the output of the timer circuit 27. The output of this OR gate 30 is applied to the D input terminal of the F.F. 4 and to the C input terminal of the F.F. 16.

According to the illustrated arrangement of the OR gate 30, as will be understood with the help of the description of the first to the third embodiment, the user may choose a first mode where, while looking at the TV receiver type monitor, he continues pushing down the repeat reproduction key 21 for a time period longer than a predetermined period controlled by the timer circuit 27 until the beginning of the desired scene to be reproduced repeatedly appears. Then he stops depressing the repeat reproduction key 21 to thereby manually index the initial end of the repeat reproduction. He may otherwise stop depressing the repeat reproduction key 21 as soon as it is pushed down, that is before the predetermined time period controlled by the timer circuit 27 elapses. Thereby a second mode is chosen in which the initial end of the repeat reproduction is automatically indexed depending upon the time period controlled by the timer circuit 27.

It is to be understood from the foregoing that in this or fourth embodiment, the first mode where the length of the section for the repeat reproduction is optionally determined and the second mode where the length of the section for the repeat reproduction is set to a predetermined constant value can be selectively put into operation depending upon the different ways of handling only one key. This feature makes the apparatus handling very convenient to the user. And, as illustrated in the drawing, since there is provided the variable resistor 29 for changing the length of the section to be repeatedly reproduced, it is possible to set a repeat reproduction range of his own.

Figure 5:
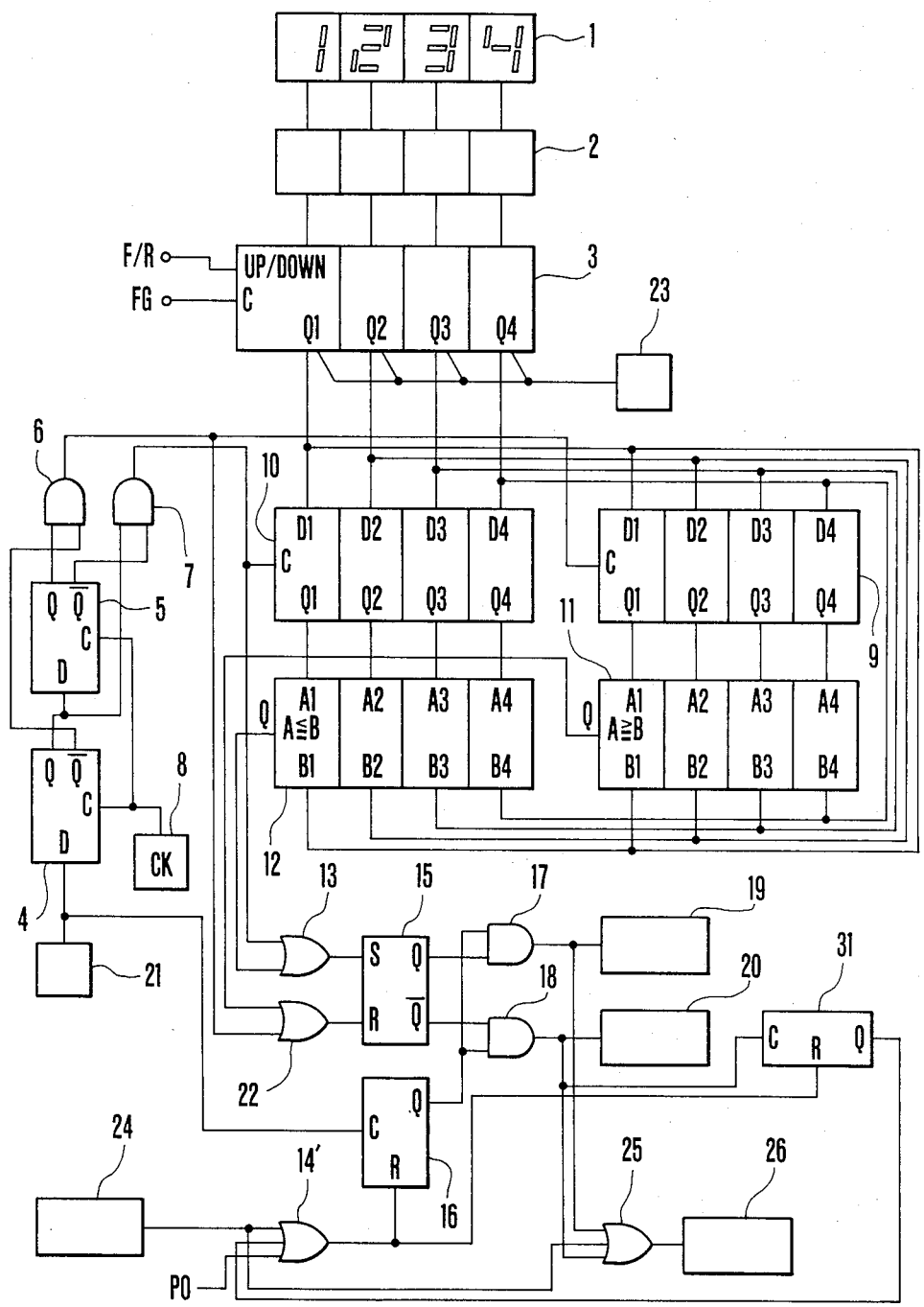

FIG. 5 illustrates a fifth embodiment of the control circuit according to the present invention wherein the similar parts to those shown in FIGS. 1 to 4 are denoted by the same reference characters and their explanation is no more given. 31 is a preset counter.

31 denotes a presettable down counter for controlling number of cycles of the repeat reproduction and is arranged to decrease its content or preset value one by one in response to each high level output of the AND gate 18 and to be reset by the output of an OR gate 14'. The OR gate 14' is arranged to receive the output signal of the normal reproduction key 24, power-on signal PO and Q output of the counter 31. The output of the OR gate 14' is applied to the reset terminals R of the counter and the F.F. 16.

At each time the output of the AND gate 18 goes high at the state of every one cycle of the tape forward advancing for the repeat reproduction, the counter 31 decreases its content or preset value one by one in response to each high level output of the AND gate 18. When the content of the counter 31 becomes zero that is the number of the high level output of the AND gate 18 has reached a preset value of the counter 31, the counter 31 produces a high level output at its Q terminal which is then applied through the OR gate 14' to the reset terminal R of the flip-flop 16, thereby the F.F. 16 is reset and thus the repeat reproducing operation is terminated. The counter 31 is also reset by the output of the OR gate 14'.

Despite the count of the predetermined number of the high level outputs of the AND gate 18 is not yet reached, when the normal reproduction key 24 is pushed down, the repeat reproduction operation is terminated. That is, the Q output of F.F. 16 is changed to low level, thereby the gates 17 and 18 are gated off.

As has been described above, this embodiment of the information signal reproduction apparatus has a function, despite the user gives no command of stopping the repeat reproduction, to automatically stop the repeat reproduction when a predetermined number of cycles of reproducing operations has been performed. Therefore, even if the user forgets switching off the apparatus in the repeat reproduction mode, there is no possibility of reproducing the magnetic recording medium at the same portion endlessly in vain with the result of shortening the life of the recording medium. It is still possible to stop the repeating of the reproduction at any desired time. That is, the preset value of the presettable down counter 31 may preferably be changed among different values. These features contribute to a convenient handling of the apparatus.

It should be recognized that though each of the foregoing embodiments has been described in connection with the reel motor of which the number of revolutions is counted to indicate where is being reproduced, the number of revolution of a capstan motor may be otherwise counted.

Also, though the circuit is constructed so that even when the tape is rewound during the repeat reproduction the reproducing circuit is left operative, it may be otherwise constructed so that in all the cycle of reproducing operation except the first one for use in determining the initial end of repeat reproduction, the reproducing circuit is rendered inoperative when in the reverse movement of the tape. And the rewinding or backward advancing of the tape may preferably be performed at a speed faster than that of the forward advancing of the tape.

What I claim:

1. An information signal reproducing apparatus, comprising:
   (a) reproducing means for reproducing information signals recorded on a recording medium;
   (b) moving means for moving said recording medium relative to said reproducing means;
   (c) manually operable means for indexing a first position and a second position on said recording medium; and
   (d) control means for controlling at least the operation of said moving means so that those of the information signals which have been recorded in an area of the medium between said first and said second positions are repeatedly reproduced in either direction.

2. An apparatus according to claim 1, wherein said recording medium is in the form of a tape, and said moving means is arranged to move said medium in its longitudinal direction.

3. An apparatus according to claim 2, wherein said control means controls said moving means in such a manner that said recording medium is moved at a first speed in a first direction and for a reversed or second direction to the first direction, said recording medium is moved at a second speed faster than the first speed.

4. An apparatus according to claim 3, wherein said information signals include video signals.

5. An apparatus according to claim 4, wherein said manually operable means is arranged to index said first position by a first operation thereof and said control means controls said moving means in such a manner that said medium is moved in said second direction in response to said first operation.

6. An apparatus according to claim 5, wherein said second position is indexed on the basis of a second operation of said manually operable means subsequent to said first operation thereof.

7. An apparatus according to claim 2, wherein said control means includes a counter for counting pulse signal corresponding to the movement of said medium.

8. An apparatus according to claim 7, wherein said control means includes first and second registers for respectively memorizing the data provided by said counter when said manually operable means is operated.

9. An apparatus according to claim 8, wherein said control means further includes first and second comparators for respectively comparing the data provided by said counter with the data stored in said first and second registers.

10. An apparatus according to claim 9, wherein said control means further includes a control circuit for controlling the operation of said moving means on the basis of the outputs of said first and second comparators.

11. An information signal reproducing apparatus comprising:
    (a) reproducing means for reproducing information signals recorded on a recording medium;
    (b) moving means for moving said recording medium relative to said reproducing means;
    (c) manually operable indexing means for indexing a first position on said medium;
    (d) automatic indexing means for automatically indexing a second position on said medium on the basis of the indexing of the first position by said manually operable indexing means; and
    (e) control means for controlling at least said moving means in such a manner that those of the information signals which have been recorded in an area of the medium between said first position and said second position is repeatedly reproduced, said control means controls said moving means in such a manner that when the first position is indexed by said manually operable indexing means, said medium is moved in a second direction opposite to a first direction in which the normal reproduction operates.

12. An apparatus according to claim 11, wherein said recording medium is in the form of a tape, and said moving means is arranged to move said medium in its longitudinal direction.

13. An apparatus according to claim 12, wherein said information signals include at least video signals.

14. An apparatus according to claim 13, wherein said control means renders said reproducing means operative to reproduce said video signal during a time interval from a moment at which the first position has been indexed by said manually operable indexing means to a moment at which the second position is indexed by said automatic indexing means.

15. An apparatus according to claim 11, wherein said automatic indexing means includes a timer circuit responsive to indexing of the first position by said manually operable indexing means for producing an output signal representing a timing in a predetermined period and said second position is indexed by using the output of said timer circuit.

16. An information signal reproducing apparatus comprising:
   (a) reproducing means for reproducing information signals recorded on a recording medium;
   (b) moving means for moving said recording medium relative to said reproducing means;
   (c) manually operable indexing means for indexing a first position on said medium;
   (d) automatic indexing means for automatically indexing a second position on said medium on the basis of the indexing of the first position by said manually operable indexing means; and
   (e) control means for controlling at least said moving means in such a manner that those of the information signals which have been recorded in an area of the medium between said first position and said second position is repeatedly reproduced, said control means includes a counter for counting pulse signals corresponding to the movement of said medium, a first register for respectively memorizing the data provided by said counter when the first position is indexed by said manually operable means, and a second register for memorizing the data provided by said counter when the second position is indexed by said automatic indexing means.

17. An apparatus according to claim 16, wherein said control means further includes first and second comparators for respectively comparing the data provided by said counter with the data stored in said first and second registers.

18. An apparatus according to claim 17, wherein said control means further includes a control circuit for controlling the operation of said moving means on the basis of the outputs of said first and second comparators.

19. An information signal reproducing apparatus comprising:
   (a) reproducing means for reproducing the information signals recorded on a tape-shaped recording medium;
   (b) moving means for moving said recording medium in its longitudinal direction;
   (c) manually operable means for indexing a first position and a second position in a longitudinal direction of the recording medium;
   (d) automatic indexing means responsive to detection of the fact that the distance between the first position and the second position indexed by said manually operable means falls within a predetermined distance for automatically re-indexing said second position; and
   (e) control means for controlling at least said moving means so that an area of the medium between said first position and said second position is repeatedly reproduced in at least one of two directions.

20. An apparatus according to claim 19, wherein said manually operable means is arranged upon its first operation to index said first position and upon its second operation subsequent thereto to index said second position.

21. An apparatus according to claim 20, wherein during a time from said first operation to said second operation of the manually operable means, said control means causes the moving means to move the recording medium at a constant speed in a second direction opposite to a first direction in which the normal reproduction operates.

22. An apparatus according to claim 21, wherein said automatic indexing means is arranged to cancel the second operation of the manually operable means when the time from said first operation to said second operation of the manually operable means falls within a predetermined time and after said predetermined time from said first operation elapsed indexes said second position automatically.

23. An information signal reproducing apparatus comprising:
   (a) reproducing means for reproducing information recorded on a tape-shaped recording medium;
   (b) moving means for moving said medium in its longitudinal direction;
   (c) indexing means including a manually operable key for indexing a first position and a second position in the longitudinal direction of said recording medium, said key having a first state and a second state, and when said key is changed from the first state to the second state by a manual operation, said first position is indexed, and when from the second state to the first state, said second position is indexed; and
   (d) control means for controllling at least said moving means so that an area of the medium between said first position and said second position is repeatedly reproduced in at least one of two directions when said key is in said second state, said control means controls said moving means in such a manner that said medium is moved in a second direction opposite to the first direction in which the normal reproduction operates.

24. An apparatus according to claim 23, wherein when said key is in said second state, said control means controls said reproducing means so that said information signal is reproducible from said medium.

25. An information signal reproducing apparatus comprising:
   (a) reproducing means for reproducing information recorded on a tape-shaped recording medium;
   (b) moving means for moving said medium in its longitudinal direction;
   (c) indexing means including a manually operable key for indexing a first position and a second position in the longitudinal direction of said recording medium, said key having a first state and a second state, and when said key is changed from the first state to the second state by a manual operation, said first position is indexed, and when from the second state to the first state, said second position is indexed; and
   (d) control means for controlling at least said moving means so that an area of the medium between said first position and said second position is repeatedly reproduced in at least one of two directions when said key is in said second state, said control means controls said moving means so that said medium is moved at a second speed faster than a first speed in which the normal reproduction operates.

26. An information signal reproducing apparatus comprising:
   (a) reproducing means for reproducing information signals recorded on a tape-shaped recording medium;
   (b) moving means for selectively moving said recording medium in a first direction to effect normal reproducing and a second direction opposite to said first direction;
   (c) manually operable means for indexing a first position and a second position in a longitudinal direction of said recording medium, said manually operable means in its first operation indexing said first position and in its second operation subsequent to said first operation indexing said second position; and
   (d) control means for controlling at least said moving means so that an area of the medium between said first position and said second position is repeatedly reproduced while the medium is moved in at least said first direction, said control means controlling said moving means so that said medium is moved in said second direction in response to said first operation.

27. An apparatus according to claim 26, wherein said control means includes a counter for counting a pulse signal corresponding to the movement of said medium.

28. An apparatus according to claim 27, wherein said control means further includes first and second registers for memorizing the data provided by said counter when said manually operable means is in said first and said second operations respectively.

29. An apparatus according to claim 28, wherein said control means includes first and second comparators for respectively comparing the data provided by said counter with the data stored in said first and second registers.

30. An apparatus according to claim 29, wherein said control means further includes a control circuit for controlling the operation of said moving means on the basis of the outputs of said first and said second comparators.

31. An apparatus according to claim 30, wherein said information signals include video signals.

32. An information signal reproducing apparatus comprising:
   (a) reproducing means for reproducing information signals recorded on a recording medium;
   (b) moving means for moving said recording medium relative to said reproducing means;
   (c) manually operable indexing means for indexing a first position and a second position on said recording medium; and
   (d) control means for controlling at least the operation of said moving means so that those of the information signals which have been recorded in an area of the medium between said first and said second positions are repeatedly reproduced, said control means includes a counter for counting pulse signals corresponding to the movement of said medium, a first register for respectively memorizing the data provided by said counter when the first position is indexed by said manually operable means, and a second register for memorizing the data provided by said counter when the second position is indexed by said manually operable means.

33. An apparatus according to claim 32, wherein said control means further includes first and second comparators for respectively comparing the data provided by said counter with the data stored in said first and second registers.

34. An apparatus according to claim 33 wherein said control means further includes a control circuit for controlling the operation of said moving means on the basis of the outputs of said first and second comparators.

35. An information signal reproducing apparatus comprising:
   (a) reproducing means for reproducing information signals recorded on a recording medium; p1 (b) moving means for moving said recording medium in a longitudinal direction;
   (c) first manually operable means for ordering repeat reproduction of a desired area of said medium;
   (d) control means for controlling said moving means and said reproducing means in response to said first indicating means to perform said repeat reproduction; and
   (e) second manually operable means for controlling the reproduction operation of said reproducing means when said control means is not performing said repeat reproduction and for releasing said repeat reproduction when said control means is performing said repeat reproduction.

36. An apparatus according to claim 35, wherein said first manually operable means is operative to release said repeat reproduction when said control means is performing said repeated reproduction.

* * * * *